June 6, 1939.   G. T. ELLIS ET AL   2,161,703
LINE HOLDER
Filed April 28, 1937
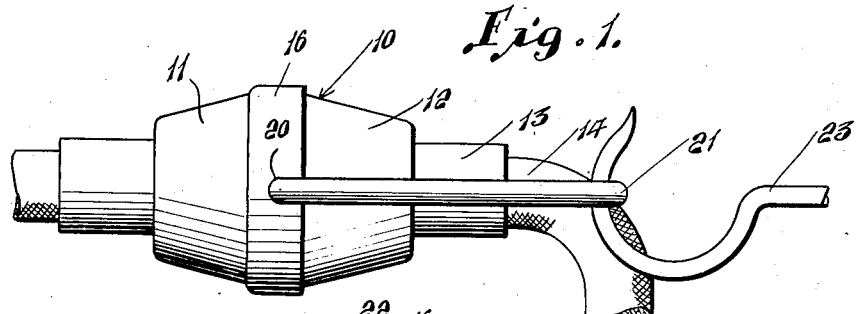
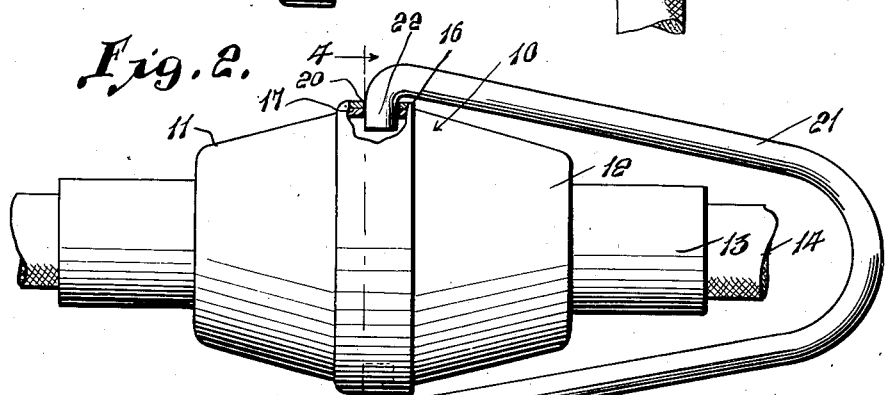
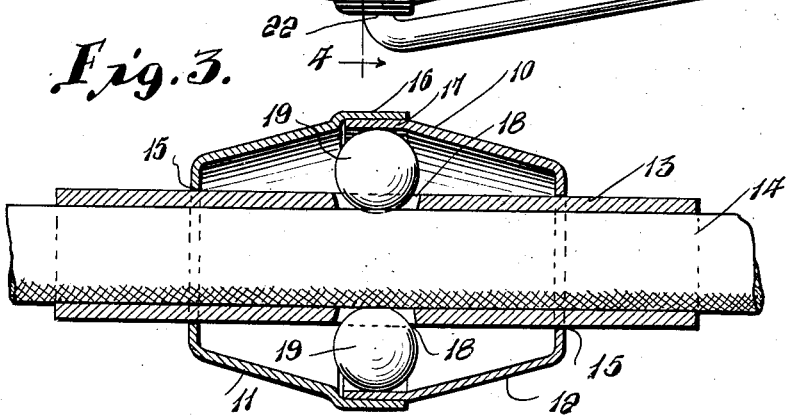
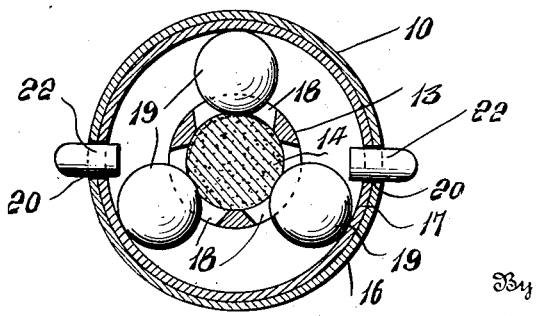
Inventor.
R. C. Bratton, G. T. Ellis Patented June 6, 1939

2,161,703

UNITED STATES PATENT OFFICE 2,161,703

LINE HOLDER

George T. Ellis and Robert C. Bratton, Detroit, Mich.

Application April 28, 1937, Serial No. 139,622

2 Claims. (Cl. 24—126)

This invention relates to improvements in line holders and is especially adapted for use with our Endless clothesline pulley as disclosed in United States Letters Patent No. 2,057,566 issued October 13, 1936.

The object of this invention is to provide a device whereby a line, cable, or wire can be clamped in any desired position and supported by a hook or like means.

Another object of the invention is to provide a device that can be used to clamp a line from either direction without removing the line from the holder.

Another advantage of the invention resides in providing a device that will permit the line to be drawn through the device in either direction if it is desired to tension the line.

Other objects and advantages of the invention will become apparent from the specification of which the drawing forms a part and wherein:

Figure 1 is a side elevational view of the device;

Figure 2 is a top plan view partly in section of the same;

Figure 3 is a longitudinal vertical sectional view of the invention, and

Figure 4 is a cross sectional view on the line 4—4 of Figure 3.

Referring more particularly to the drawing wherein like reference characters designate like or corresponding parts in the different views, a casing 10 comprising sections 11 and 12 is adapted to mount a sleeve 13 through which is threaded a line 14.

Sections 11 and 12 are provided with corresponding openings 15 in which sleeve 13 is mounted. Section 11 is provided with an offset portion 16 into which portion 17 of section 12 is adapted to be telescoped.

The sleeve 13 is provided with a series of corresponding openings 18 about its periphery which are adapted to permit the balls 19 mounted in casing 10 to frictionally engage the line 14 and the cylindrical portion 17 of casing 10 when the sleeve 13 is in its normal position so that a pull on the line from either direction will move the sleeve 13 relatively to the casing 10 to cause balls 19 to be wedged between line 14 and the tapered ends 11 or 12, as seen in Figure 3.

Portions 16 and 17 of casing 10 are provided with alined openings 20 to receive the inturned ends 22 of bail 21 as best seen in Figure 4. The ends 22 hold the sections 11 and 12 in assembled position. The bail 21 is adapted to engage an anchoring means, such as hook 23, to attach the line.

In operation, assuming the device to be assembled as shown in the drawing, the line 14 is of sufficient diameter to force balls 19 outwardly of sleeve 13 and into frictional engagement with portion 17 so that balls 19 are held between and in frictional engagement with the line 14 and portion 17 so that a pull on line 14 will cause sleeve 13 to move longitudinally in the casing 10 causing balls 19 to move into engagement with the tapered portion 11 thereby wedging balls 19 between the tapered portion 11 and the line 14 preventing further movement in that direction. By swinging the bail 21 to an opposite position the device can be used to hold line 14 against movement in the opposite direction without otherwise adjusting the device, the balls 19 will then engage the annular tapered portion 12. If it is desired to adjust the line 14 relatively to the casing 10, casing 10 and sleeve 13 can be gripped, while in the position shown in Fig. 3, and the line 14 can be drawn through sleeve 13.

It is to be understood that the invention is not limited to use with our aforementioned patent, but is also intended and adapted for any use where a line, cable, or wire is desired to be held. Only the preferred embodiment of the invention has been shown, the right being reserved to make such changes and modifications as will not depart from the spirit and scope of the invention.

We claim as our invention:

1. In a line holder, a casing having a cylindrical intermediate portion and annular converging ends defining openings at the ends of said casing, a tube slidably mounted in said openings, extending through said casing and disposed centrally thereof, said tube having a series of circumferentially disposed spaced openings intermediate of its ends, balls mounted in said casing and projecting partially through said openings into said tube, said balls being normally disposed contiguously with the cylindrical portion of said casing, and a line extending through said tube, said line being of a diameter sufficient to engage the balls and to urge them outwardly whereby the balls will be disposed between and in frictional engagement with the line and cylindrical portion of the casing so that a pull in either direction on the line will move the balls and tube relatively to said casing whereby the balls will contact one of said annular converging ends and be moved inwardly thereby and into wedging engagement with the line.

2. A device of the class described comprising a casing having a cylindrical portion and an annular converging end, said casing having aligned restricted openings at its ends, a sleeve extending through said casing disposed centrally thereof and slidably mounted in said openings, said sleeve having a series of spaced circumferentially arranged openings intermediate of its ends, spherical shaped wedge members mounted in said casing and projecting partially through said last mentioned openings and into said sleeve, said spherical wedge members being normally disposed contiguously with the cylindrical portion of said casing, and a line extending through said sleeve and of a diameter sufficient to engage said spherical wedge members to force them outwardly of said sleeve and into engagement with said cylindrical portion whereby said spherical wedge members will be held between and in frictional engagement with the line and cylindrical portion of the casing so that a pull on said line in one direction will move the sleeve and wedge members so that said wedge members will contact the converging ends of said casing and be urged inwardly thereby to clamp the line.

GEORGE T. ELLIS.
ROBERT C. BRATTON.